Patented Oct. 10, 1933

1,930,134

UNITED STATES PATENT OFFICE 1,930,134

CELLULOSE ORGANIC ESTER COMPOSITION CONTAINING PROPYLENE CHLORIDE

Henry B. Smith, Rochester, N. Y., assignor to Eastman Kodak Company, Rochester, N. Y., a corporation of New York No Drawing. Application February 2, 1932
Serial No. 590,518

4 Claims. (Cl. 106—40)

This invention relates to cellulose organic ester compositions, and to solvents for cellulose organic esters. Its object is to provide solvent mixtures from which cellulose organic ester films may be coated which will have good flexibility and transparency.

Propylene chloride has always been regarded as a nonsolvent for cellulose acetate. While I have confirmed this fact, I have discovered that a mixture of propylene chloride with a liquid monohydroxy alcohol or with a liquid organic ester or with acetone is an excellent solvent for cellulose acetate, and that transparent films of superior flexibility may be obtained by coating the cellulose acetate from solution in one of these solvent mixtures. These solvent mixtures are also solvents for the mixed and higher organic esters of cellulose, such, for instance, as cellulose acetate-propionate, cellulose acetate-stearate, and cellulose butyrate, and for the alkyl and aryl ethers of cellulose, such, for instance, as ethyl cellulose and benzyl cellulose.

In carrying out my invention, I may use solvent mixtures of from 90% to 50% of propylene chloride with from 10% to 50% of alcohol or ester, although I have found proportions of approximately 80% of propylene chloride and 20% of alcohol or ester to be preferable. Examples of the alcohols which I may use are ethyl alcohol, methyl alcohol, and benzyl alcohol. Examples of the esters which I may use are ethyl lactate and ethyl formate. In the case of certain types of cellulose acetate, films coated from a mixture of propylene chloride and an aliphatic alcohol may show a tendency to blush. This tendency may be overcome, and the production of a clear film assured, by the addition of a high boiler such as ethyl lactate or benzyl alcohol. When a mixture of propylene chloride and acetone is used, I may use as low as 20% of propylene chloride, with 80% of acetone, but I have found that a mixture containing approximately 40% or even more of propylene chloride and 60% or even less of acetone gives films of superior flexibility.

The following is an example of the manner in which I may proceed in carrying out my invention. To 480 parts by weight of propylene chloride are added 120 parts by weight of ethyl alcohol, and 50 parts by weight of ethyl lactate as an anti-blushing agent. In this mixture, 100 parts by weight of cellulose acetate are dissolved with stirring. A clear solution results. It will be understood that I may vary the proportions of the solvent components, and/or the ratio of solvent mixture to cellulose acetate. I may also use a different anti-blushing agent, such, for instance, as benzyl alcohol.

A composition of matter prepared as above described may be deposited upon any suitable film-forming surface to form a film or sheet, in a manner well known to those skilled in the art. A film so produced has permanently brilliant transparency and low inflammability. Moreover, when cellulose acetate films coated from my novel solvent mixtures are tested on the modified Schopper fold-tester, commonly used in testing cellulosic films, they show flexibility greatly superior to that of cellulose acetate films coated from acetone, which is the most commonly used solvent for cellulose acetate. For instance, a film coated from 80% propylene chloride and 20% ethyl alcohol withstood 16 folds, a film coated from 80% propylene chloride and 20% methyl alcohol withstood 12 folds, a film coated from 80% propylene chloride and 20% ethyl lactate withstood 9 folds, a film coated from 80% propylene chloride and 20% ethyl formate withstood 14 folds, and a film coated from 40% propylene chloride and 60% acetone withstood 10 folds, whereas a film coated from acetone alone withstood only 3 folds. These may be coated, for instance, from a solution of 100 parts of cellulose acetate in from 300 to 600 parts of the mixed solvent. Cellulose acetate-propionate skins coated from mixtures of propylene chloride and acetone in ratios of from 20 to 60% propylene chloride to from 80 to 40% acetone showed flexibilities equal to or greater than those of cellulose acetate-propionate skins coated from ethylene chloride alone, whereas cellulose acetate-propionate skins coated from acetone alone were brittle.

While I have given examples of the alcohols and esters which I may use in my solvent mixtures with propylene chloride, it will be understood that I do not limit myself to these examples. In place of ethyl, methyl or benzyl alcohol, I may use other liquid alcohols which are compatible with propylene chloride and the cellulose organic derivatives. In place of ethyl lactate or ethyl formate, I may use other liquid organic esters which are compatible with propylene chloride and the cellulose organic derivatives Inasmuch as my above-described compositions of matter are useful in the production of films, it will be obvious to those skilled in the art that they may also be employed to advantage in the manufacture of other cellulose organic derivative products in which good flexibility is desired, for instance, in the manufacture of wrapping sheets or tissues, or of artificial silk.

What I claim as my invention and desire to be secured by Letters Patent of the United States is:

1. A composition of matter comprising cellulose acetate, propylene chloride, and ethyl lactate.

2. A composition of matter comprising a cellulose organic ester containing an acyl radical having more than two carbon atoms, propylene chloride and ethyl lactate.

3. A composition of matter comprising cellulose acetate-propionate, propylene chloride and ethyl lactate.

4. A composition of matter comprising a cellulose organic ester, propylene chloride, and ethyl lactate.

HENRY B. SMITH.